United States Patent
Le Huerou et al.

(10) Patent No.: US 11,223,585 B2
(45) Date of Patent: Jan. 11, 2022

(54) METHOD FOR ORGANIZING A PLURALITY OF MESSAGES EXCHANGED WITH A CONVERSATIONAL AGENT ACCORDING TO A GROUPING IDENTIFIER AND A MESSAGE CHARACTERISTIC

(71) Applicant: Orange, Issy-les-Moulineaux (FR)

(72) Inventors: Emmanuel Le Huerou, Chatillon (FR); Francois Toutain, Chatillon (FR); Eric Beaufils, Chatillon (FR); Nathalie Begoc Becam, Chatillon (FR)

(73) Assignee: ORANGE, Issy-les-Moulineaux (FR)

(*) Notice: Subject to any disclaimer, the term of this patent is extended or adjusted under 35 U.S.C. 154(b) by 0 days.

(21) Appl. No.: 16/462,017

(22) PCT Filed: Nov. 17, 2017

(86) PCT No.: PCT/FR2017/053151
§ 371 (c)(1),
(2) Date: May 17, 2019

(87) PCT Pub. No.: WO2018/091843
PCT Pub. Date: May 24, 2018

(65) Prior Publication Data
US 2019/0334844 A1 Oct. 31, 2019

(30) Foreign Application Priority Data
Nov. 18, 2016 (FR) ...................... 1661217

(51) Int. Cl.
*H04L 12/58* (2006.01)
*G06F 16/28* (2019.01)

(52) U.S. Cl.
CPC .......... *H04L 51/046* (2013.01); *G06F 16/287* (2019.01); *H04L 51/02* (2013.01); *H04L 51/16* (2013.01); *H04L 51/34* (2013.01)

(58) Field of Classification Search
CPC .. G06F 3/0482; G06F 3/0486; G06F 3/04883; G06F 13/00; G06F 16/28;
(Continued)

(56) References Cited

U.S. PATENT DOCUMENTS

2004/0030750 A1 2/2004 Moore et al.
2005/0235034 A1* 10/2005 Chen ................... H04L 12/1831
709/206
(Continued)

FOREIGN PATENT DOCUMENTS

EP 2487633 A1 8/2012

OTHER PUBLICATIONS

International Preliminary Report on Patentability and English translation of the Written Opinion dated May 21, 2019 for corresponding International Application No. PCT/FR2017/053151, filed Nov. 17, 2017.
(Continued)

*Primary Examiner* — Robert B Harrell
(74) *Attorney, Agent, or Firm* — David D. Brush; Westman, Champlin & Koehler, P.A.

(57) ABSTRACT

A method for organizing a plurality of messages from an instant messaging conversation between a terminal and a conversational agent in which a message includes a grouping identifier. The method includes, when a new message is exchanged, selecting, from the messages of the conversation, at least one message having a grouping identifier that corresponds to the grouping identifier of the exchanged message, and when at least one message is selected, modifying at least one display area on the screen of the terminal corresponding to at least one of the selected messages, according to at least one characteristic of the exchanged message.

11 Claims, 5 Drawing Sheets

(58) Field of Classification Search
CPC ........ G06F 16/287; G06F 2203/04808; G06Q 10/10; G06Q 10/107; G06Q 10/109; H04L 12/58; H04L 12/581; H04L 12/585; H04L 12/4625; H04L 12/5805; H04L 12/5855; H04L 51/02; H04L 51/04; H04L 51/16; H04L 51/34; H04L 51/38; H04L 51/046; H04L 67/00; H04L 67/02; H04M 1/72552; H04M 2250/22
USPC .......................................... 715/752; 709/206
See application file for complete search history.

(56) References Cited

U.S. PATENT DOCUMENTS

| | | | | |
|---|---|---|---|---|
| 2006/0111135 | A1* | 5/2006 | Gray | H04L 65/4061 455/519 |
| 2008/0263157 | A1* | 10/2008 | Bhogal | G06Q 10/107 709/206 |
| 2010/0235758 | A1* | 9/2010 | Shen | H04L 51/04 715/752 |
| 2012/0088527 | A1* | 4/2012 | Roka | H04L 51/16 455/466 |
| 2014/0143684 | A1* | 5/2014 | Oh | G06Q 10/107 715/752 |
| 2014/0201239 | A1* | 7/2014 | Liu | H04L 51/02 707/770 |
| 2014/0358929 | A1* | 12/2014 | Bailey | G06F 16/35 707/738 |
| 2015/0006655 | A1* | 1/2015 | Fradin | H04L 51/16 709/206 |
| 2016/0359785 | A1* | 12/2016 | Ward | H04W 4/14 |
| 2017/0054664 | A1* | 2/2017 | Lee | H04L 51/16 |
| 2017/0139900 | A1* | 5/2017 | Li | H04L 51/046 |
| 2017/0142036 | A1* | 5/2017 | Li | H04L 51/04 |

OTHER PUBLICATIONS

International Search Report dated Dec. 15, 2017 for corresponding International Application No. PCT/FR2017/053151, filed Nov. 17, 2017.

Written Opinion of the International Searching Authority dated Dec. 15, 2017 for corresponding International Application No. PCT/FR2017/053151, filed Nov. 17, 2017.

* cited by examiner

METHOD FOR ORGANIZING A PLURALITY OF MESSAGES EXCHANGED WITH A CONVERSATIONAL AGENT ACCORDING TO A GROUPING IDENTIFIER AND A MESSAGE CHARACTERISTIC

CROSS-REFERENCE TO RELATED APPLICATIONS

This Application is a Section 371 National Stage Application of International Application No. PCT/FR2017/053151, filed Nov. 17, 2017, the content of which is incorporated herein by reference in its entirety, and published as WO 2018/091843 on May 24, 2018, not in English.

TECHNICAL FIELD

The present invention relates to the field of telecommunications and pertains more particularly to a method of playback for rendering a plurality of messages exchanged between a terminal and a communication device.

PRIOR ART

The public has for some years demonstrated a strong craze for communications of instant messaging type. Indeed, this mode of communication affords more interactivity than communication by email while being less intrusive than voice communication. Mass adoption of this mode of communication and the arrival on the market of touchscreen mobile terminals has been accompanied by advances in user interfaces making it possible to facilitate this mode of communication. Thus, user interfaces are today converging toward a conversational view in which the messages sent and the messages received are presented in bubbles arranged on either side of the screen of the terminal and ordered chronologically. Barring a few exceptions, this type of presentation in conversation form is predominant on most terminals and messaging applications, all brands considered.

This type of communication is now so pervasive that today it is no longer reserved for exchanges between physical people. Indeed, today it is possible to exchange messages with software robots capable of interpreting messages sent by users and of responding thereto in a more or less relevant way. It is possible to cite for example robots specializing in meteorological forecasts capable of responding to messages of the type "what will the weather be tomorrow in Paris?". Thus, a user has a unified interface for communicating with other users and for accessing services. This type of robot capable of interacting with users by exchanging messages is sometimes called a "conversational agent".

The use of this type of communication is expanding still further today with the advent of "conversational commerce". Conversational commerce implements robots adapted to allow users to place orders for goods or services. Thus, users need no longer download a dedicated application or access a website to place an order, and the service provider does not need to publish and to maintain an application or a website.

Although, as has been seen, this type of interaction presents undeniable advantages, in particular for users in terms of uniqueness of user experience and reduction in the number of applications required in order to access the services, the presentation of the exchanges of messages in conversation form such as it is implemented today on a majority of terminals poses certain problems.

In particular, this mode of communication is not always suitable for exchanges with conversational agents. For example, to subscribe to a service or to place an order with a supplier through a conversational commerce interface, it is generally necessary to exchange several messages. Thus, between the first message initiating the transaction and the last message terminating it, about ten messages may have been exchanged. The history of the exchanges is generally of little interest to the user when the transaction has finished and the product and/or service has been delivered, but unnecessarily occupy space in the memory and on the screen of the terminal. Moreover, the large number of messages, due to successive orders, may lead to confusion for the user who may have difficulty in identifying the transactions to which the messages relate.

Techniques are known which make it possible to optimize this kind of conversational view of the exchanges, such as for example the technique set forth in patent application US 2014/0143684 A1 which makes it possible to respond to a message according to a particular conversational context. Thus, a response message can be linked with a received message so as to limit the risk of confusion of the user during cross-exchanges.

Such a technique makes it possible to improve user readability, but it does not modify the number of messages stored and/or displayed on the terminal. Thus, unnecessary messages continue to occupy display space on the screen and/or memory space of the terminal.

The SMS protocol affords the possibility of concatenating various messages so as to display just one. Accordingly, the sending terminal places a "UDH" (for User Data Header) header in the SMS message, the header comprising a reference number which must be the same in the various messages to be concatenated. The receiving terminal assembles the various messages received comprising the same reference number so as to display just one. Such a technique makes it possible to alleviate the 160-character limit imposed by the SMS protocol. However, such a technique allows only the concatenation of consecutive SMSs and does not allow satisfactory optimization of the presentation of a conversation comprising messages sent and received.

Another technique consists in displaying only the last message received and/or sent of a conversation, in association with the name of the opposite party.

However, the last message exchanged in a conversation is not always representative of the messages exchanged in the course of the conversation.

A need therefore exists to optimize the management of messages during communications with a conversational agent through an instant messaging application.

SUMMARY OF THE INVENTION

To this effect, the invention relates to a method for organizing a plurality of messages of an instant messaging conversation between a terminal and a conversational agent, the method being noteworthy in that a message comprises a grouping identifier and that the method comprises the following steps when a new message is exchanged:

selection, from among the messages of the conversation, of at least one message whose grouping identifier corresponds to the grouping identifier of the message exchanged, When at least one message is selected:

Modification of at least one display area on the screen of the terminal corresponding to at least one of the messages selected, according to at least one characteristic of the message exchanged.

When a new message is sent or received, the method proposes to modify the display of at least one message which has a common identifier with this new message. The modification of the display is carried out as a function of a characteristic of the message exchanged. In this way, the method allows automatic reorganization of the messages exchanged around one and the same subject so as, for example, to limit the space occupied by these messages when they are displayed on the screen.

Within the framework of this description, by conversational agent is meant an automaton adapted to automatically respond to messages sent by a user. Such a conversational agent is in particular adapted to interpret orders or key words included in messages that it receives. In particular, such a conversational agent can be configured to allow a user to carry out a transaction by exchanging messages on the basis of instant messaging. Such conversational agents are generally implemented by computer programs executed on servers having communication interfaces adapted to receive and send instant messages, such as SMSs, MMSs or other types of messages complying with the RCS standard.

Thus, when a user carries out a transaction by exchanging messages with a conversational agent configured for commerce, the messages which relate to a particular transaction are distinguished by a grouping identifier. On the basis of this identifier, the method can reorganize the display of the messages which relates to a particular transaction. The way in which the messages are reorganized depends on a characteristic of a received or sent message. Such a characteristic may be a key word contained in the message, an identifier of the dispatcher or of the message, the size of the message, its type or else for example its date of dispatch.

In a conventional manner, the applications of instant messaging display the messages sent and received in conversation bubbles. Such a conversation bubble corresponds to a display area for a particular message. The method allows the modification of content of one or more of these conversation bubbles.

According to a particular realization the method is such that the grouping identifier is associated with an ongoing interaction with the conversational agent that sent the message, the interaction comprising a plurality of successive states.

A grouping identifier making it possible to group together messages exchanged is assigned to a particular interaction between a user and a conversational agent. Such an interaction can correspond for example to a transaction aimed at making a purchase or a reservation or subscribing to a service. To be successfully achieved, such interactions comprise a plurality of distinct states and require the exchange of various messages. For example, the state of an order may be: "received" or "paid", "in delivery" and "delivered". The transitions between these states are caused by the exchanging of particular messages. The grouping identifier included in the message makes it possible to identify the transaction to which the messages relate, so that it is possible for a terminal to modify the display of the messages that relate to a particular transaction.

According to a particular embodiment, the method is noteworthy in that the at least one characteristic of the message exchanged comprises an indication relating to a state of progress of the interaction with the conversational agent.

In this way, a terminal can modify the display area of a message according to the state of an ongoing transaction with a conversational agent. For example, the color of a conversation bubble can be modified according to the progress of a transaction. According to another example, messages can be deleted or grouped together within one and the same conversation bubble when a particular step of an ongoing interaction is completed. For example, when a reservation attains the "confirmed" state, the previous messages relating to the selection of a timeslot can be masked or deleted.

According to a particular embodiment, the method is such that it further comprises a step of rendering a notification on the terminal, the notification being rendered according to the at least one characteristic of the message exchanged.

Thus the method makes it possible to render a particular notification according to at least one characteristic of the message sent or received. For example, a particular sound notification may be rendered when a message confirming an order is received. Such a provision also allows the optional rendering of a visual notification on a screen associated with the terminal, according to a characteristic of the message.

According to a particular realization, the method is such that the at least one characteristic of the message exchanged comprises an indication according to which the message is the last message of a series of messages associated with the same grouping identifier.

The exchanged message's characteristic according to which the display area of a message is modified comprises an information item specifying that one is dealing with the last message exchanged within the framework of a particular interaction with the conversational agent. For example, in the case of a reservation made by way of instant messaging, a message confirming this reservation may comprise an indication according to which one is dealing with the last message. The terminal may then modify the display of one or more messages which relate to this reservation.

According to a particular embodiment, the method is such that the step of modifying at least one display area comprises the replacing in a display area of at least one message selected with the message exchanged.

On receiving or else when sending a new message, at least one message exchanged previously and possessing the same grouping identifier is replaced with the new message. For example, during exchanges with a conversational agent, only the last message sent and the last message received are preserved. The previous messages are masked or deleted. In this way, the method allows optimization of the memory and of the display of the terminal.

According to a particular embodiment, the method is such that the step of modifying at least one display area comprises the masking of the selected messages, and the displaying of a message representative of the masked messages.

The terminal can thus mask the various messages exchanged during a transaction and display a single conversation bubble in which an information item representative of the state of the order is displayed. A representative message such as this may be generated dynamically by the terminal on the basis of the previously exchanged messages comprising the same grouping identifier, may correspond to the last message received or may result from a concatenation of previously received messages.

According to a particular realization, the method is such that it further comprises a step of canceling the modifications of the at least one display area when an interaction on a modified display area is detected.

An interaction of the user on a conversation bubble in which an information item representative of messages exchanged previously is displayed thus makes it possible to restore the display of the messages on the basis of which the representative message is generated. In this way, the user of the terminal can choose to restore the display of the original messages by performing an action on a user interface element associated with a particular interaction.

According to another aspect, the invention relates to a device for organizing a plurality of messages of an instant messaging conversation between a terminal and a conversational agent. Such a device is noteworthy in that it comprises the following modules:

a communication module, adapted to send and receive messages comprising a grouping identifier through a communication network, a memory, adapted to store messages comprising a grouping identifier, a selection module implemented when receiving or sending a new message comprising a grouping identifier, the module being adapted to select from among the messages stored in the memory, at least one message whose grouping identifier corresponds to the grouping identifier of the new message, and a display module implemented when at least one message is selected to modify at least one display area on the screen of the terminal corresponding to at least one of the messages selected, according to at least one characteristic of the message exchanged.

According to a particular realization, the invention relates to a terminal comprising an organizing device such as described hereinabove.

In a particular embodiment, the various steps of the method according to the invention are determined by instructions of computer programs.

Consequently, the invention also envisages a computer program comprising instructions for the execution of the steps of the organizing method, when said program is executed by a processor.

Such a program can use any programming language, and be in the form of source code, object code, or of code intermediate between source code and object code, such as in a partially compiled form, or in any other desirable form.

Finally, the invention relates to an information medium readable by a processor on which is recorded a computer program comprising instructions for the execution of the steps of the organizing method.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk. Moreover, the information medium can be a transmissible medium such as an electrical or optical signal, which can be conveyed via an electrical or optical cable, by radio or by other means. The program according to the invention can be in particular downloaded over a network of Internet type. Alternatively, the information medium can be an integrated circuit in which the program is incorporated, the circuit being adapted to execute or to be used in the execution of the method in question.

The various aforementioned embodiments or characteristics of realization can be added independently or in combination with one another, into the steps of the organizing method such as defined hereinabove.

The terminals, devices and programs exhibit at least advantages analogous to those conferred by the corresponding organizing method.

LIST OF FIGURES

Other characteristics and advantages of the invention will be more clearly apparent on reading the following description of a particular embodiment given by way of simple illustrative and nonlimiting example, and the appended drawings, among which.

DETAILED DESCRIPTION

Figure 1:
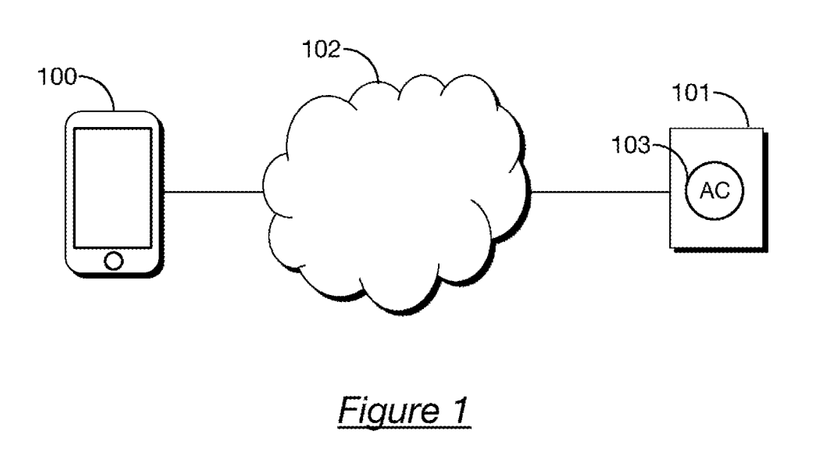
FIG. 1 illustrates a network architecture adapted for the implementation of the invention according to a particular embodiment of the invention.

FIG. 1 illustrates an architecture adapted to implement the rendering method according to a particular embodiment of the invention. Such an architecture comprises a communication terminal 100 configured to communicate through a communication network 102 with a server 101.

The server 101 comprises a conversational agent 103 adapted to respond automatically to messages sent by terminals, and in particular to respond to the messages sent by the terminal 100. Thus, the terminal 100 can interact with the conversational agent. These interactions may correspond to a transaction, a negotiation, a reservation or any other exchange allowing the terminal 100 or its user to obtain a service. The conversational agent is programmed to respond to the messages according to a logic determined by a state automaton. The automaton implemented in the conversational agent 103 is in particular adapted to make reservations for the account of the terminal 100 by way of messages exchanged with the terminal. For example, the conversational agent 103 allows the terminal 100 to make a reservation with a cinema, a restaurant, a transport means, a vehicle renter, etc. . . . . According to other examples, such a conversational agent can be adapted to order goods or services, obtain particular information such as meteorological forecasts or else be integrated into a connected item of equipment such as an automatic dispenser, parking payment station, etc. . . .

The network 102 is a communication network allowing the terminal 100 to communicate with other items of equipment, and in particular with the server 101. The communication network can be a cellular network such as a GSM, 3G or 4G network, or else an Internet network which the terminal can access by way for example of a Wifi or cellular connection.

The terminal 100 is here a mobile telephone of "smartphone" type having communication means adapted to connect to one or more communication networks, such as Wifi networks or cellular networks, and also having a memory and a processor adapted to execute computer program instructions. The invention described hereinafter can however be implemented on other terminals, such as on a tablet, a connected object, a vehicle dashboard or else a personal computer, for example in messaging software. The terminal 100 is furthermore adapted to communicate according to at least one instant messaging protocol with other terminals or devices. For example, the terminal 100 can send and receive messages of SMS (Short Message Service) type by way of a cellular network, or else implement the RCS (Rich Communication Suite) standard, the SIP SIMPLE protocol, Jabber or any other protocol adapted to send and receive messages. In particular, the terminal 100 can exchange instant messages with the server 101 through the network 102.

Figure 2A:
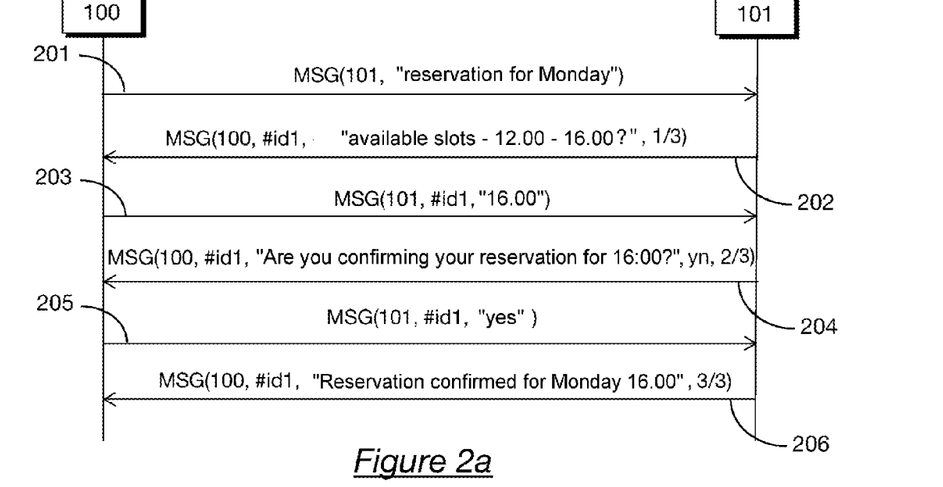
FIG. 2a represents, in the form of a timechart, messages exchanged between a terminal and a conversational agent in order to make a reservation.

FIG. 2a illustrates an exchange of messages enabling a reservation to be made with a service. This example illustrates a simple interaction with a conversational agent. It is understood that other more complex interactions, implementing more or less numerous message exchanges, can be envisaged.

Depicted is a first message 201 sent by the terminal 100 destined for the server 101. This message conventionally comprises an identifier of the recipient and a text message in which the user of the terminal 100 asks to make a reservation with a service. On receipt of the message 201, the conversational agent interprets the text field and initiates a state automaton adapted to process the reservation request. The interpretation of the text message is carried out by conventional techniques, such as the recognition of key words included in the message or on the basis of a syntactic and grammatical analysis of the message.

The conversational agent consults a database of availability and generates on the basis of the information obtained a text response 202 destined for the terminal 100. This response comprises a proposal of available timeslots and a grouping identifier #id1. This grouping identifier #id1 can be associated with the ongoing interaction and inserted into all the messages relating to this interaction. According to a particular realization of the invention, the grouping identifier #id1 is associated with a subset of the steps of the ongoing interaction, it being possible for another identifier to be associated with another subset of steps. The grouping identifier can also be associated with one or more messages, independently of the ongoing interaction. Such an identifier makes it possible to identify in a one-to-many manner the ongoing interaction in progress between the terminal and the conversational agent, or a set of particular messages and/or steps of the interaction. This identifier may for example be constructed on the basis of the call identifier of the terminal 100 and of that of the conversational agent, to which is for example added the time at which the first message was sent. According to a particular embodiment this may entail a unique identifier obtained from a dedicated server or calculated by the terminal by a pseudo-random generator known to the person skilled in the art. In this example, the text message invites the user of the terminal 100 to select a timeslot from among the proposed timeslots. According to a particular realization, the message comprises a particular characteristic. In this instance, this entails an indication relating to a state of progress of the interaction with the conversational agent. This state of progress depends on the automaton implemented by the conversational agent and comprises for example the current step of the interaction as well as the total number of steps. Thus, the message 202 can comprise an indication intended to inform the terminal 100 that the reservation process is in step 1 out of a total number of 3 steps.

On receipt of such a message, the user of the terminal 100 responds by selecting a timeslot from among the available timeslots communicated by the conversational agent in the message 202. This response is sent by the terminal 100 to the server 101 by means of a message 203 comprising a reference to the grouping identifier #id1 obtained in the message 202 and a text field comprising the timeslot selected by the user.

Subsequent to the receipt of the message 203, the conversational agent generates and sends a message 204 destined for the terminal 100 comprising the grouping identifier #id1 and a text field asking the user if he confirms the timeslot of the reservation. According to a particular embodiment, the message further comprises a particular characteristic such as an indication relating to the current step of the interaction. In this instance, the message 204 comprises an indication according to which the message corresponds to step 2 out of a total number of 3 steps.

The terminal confirms the reservation by sending a message 205 destined for the conversational agent, the message comprising the grouping identifier #id1 associated with the reservation procedure.

Finally, subsequent to the receipt of the message 205, the conversational agent transmits a message 206 confirming the reservation. According to a particular embodiment, the message 206 comprises an indication according to which the message is the last message of the interaction. In this instance, this indication specifies that this message completes the third step of an interaction which comprises 3 steps. However, any indication making it possible to identify the message as being the last message of the interaction associated with the grouping identifier, such as for example a boolean value positioned in the message, may be used.

Thus, the user of the terminal 100 can make a reservation with a particular service by exchanging messages in the form of a conversation.

Figure 2B:
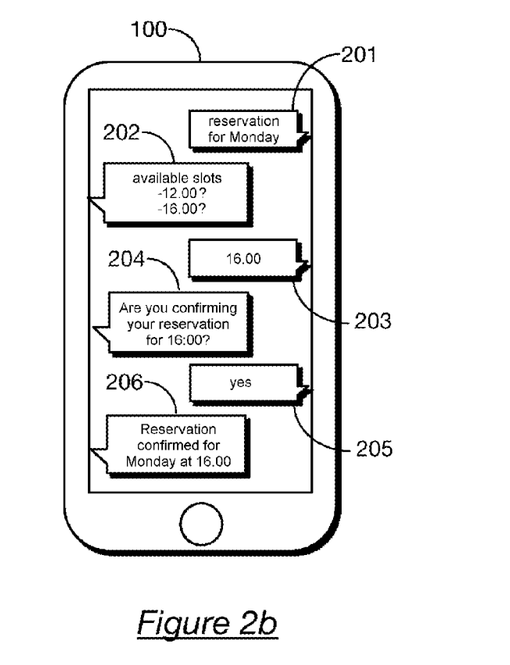
FIG. 2b illustrates a terminal on the screen of which are displayed messages in the form of a conventional conversational view.

FIG. 2b represents the terminal 100 on the screen of which are displayed, in the form of a conventional conversational view, the messages 201 to 206. The messages sent by the user of the terminal 100 to the server 101 are displayed on the right, the messages received from the server 101 are displayed on the left of the screen. These messages are displayed in a chronological manner, in such a way that a user of the terminal can reconstruct the discussion thread. Each message is furthermore displayed in its own display area, termed a "conversation bubble" with reference to the bubbles used in cartoon strips.

It is noted that the various messages exchanged occupy significant space on the screen of the terminal, as well as in its memory. Moreover, such a presentation may introduce confusion for the user of the terminal 100, in particular when two reservations are made in parallel and the messages relating to these two reservations are intercalated.

The invention improves the situation.

The steps of the organizing method according to a particular embodiment of the invention will now be described with references to FIGS. 3 and 4a, 4b and 4c.

Figure 3:
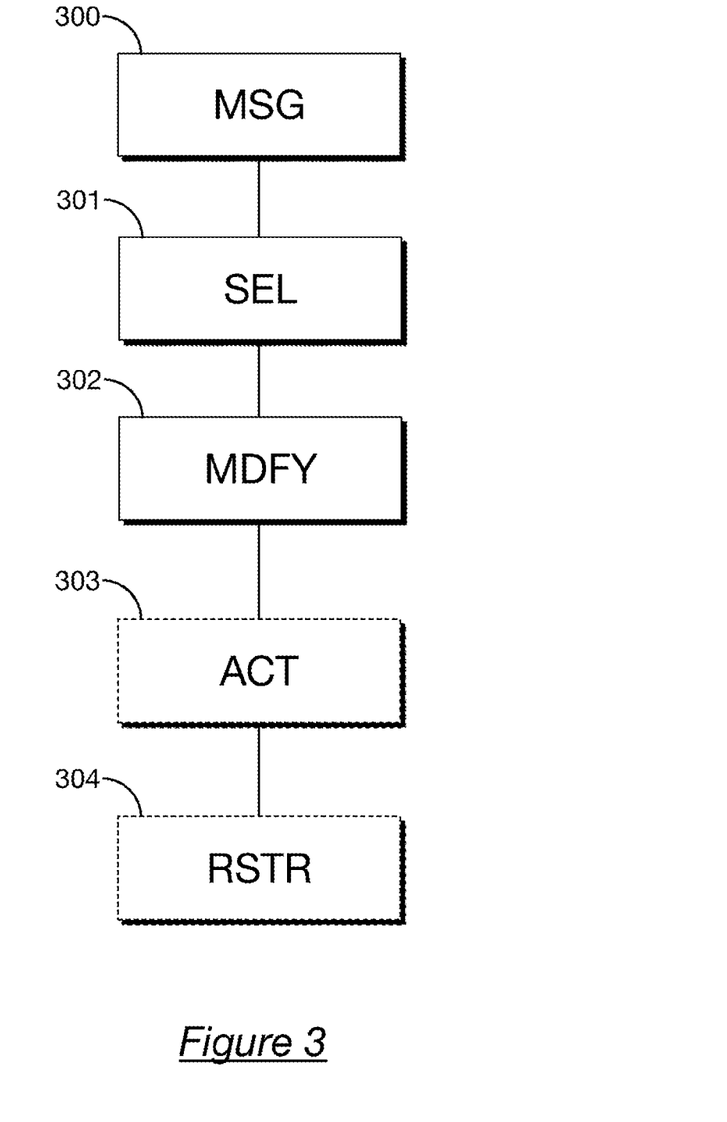
FIG. 3 illustrates the main steps of the organizing method according to a particular embodiment of the invention.

FIG. 3 illustrates the main steps of the organizing method according to a particular embodiment of the invention.

Figure 4A:
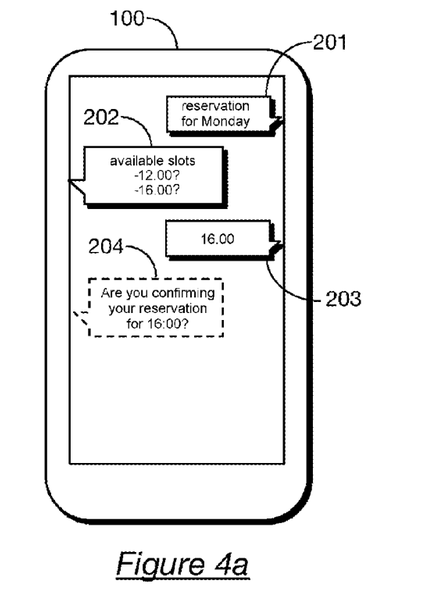
FIGS. 4a-4d represent modification of the display of messages according to a particular realization of the invention.

FIG. 4a represents the screen of the terminal 100 subsequent to the reception and the display of the messages 201, 202 and 203, as was described previously.

In step 300, the terminal receives the message 204 represented in FIG. 4a. The message 204 represented in FIG. 4a has been received but is not yet displayed.

In step 301, the terminal 100 obtains the grouping identifier #id1 included in the message 204 and searches for the messages exchanged previously with the conversational agent which comprise the same grouping identifier. This may entail messages received or sent, consecutive or non-consecutive messages. Accordingly, the terminal consults a database in which the sent and received messages are stored and selects by means for example of a suitable SQL query the messages possessing the same grouping identifier. The messages 202 and 203 are selected since they comprise a grouping identifier identical to that included in the message 204.

In step 302 the terminal modifies at least one display area corresponding to at least one of the messages selected, according to at least one characteristic of the message exchanged. Thus, at least one of the conversation bubbles corresponding to the selected messages is modified. The modification is performed as a function of a characteristic of the message 204.

Figure 4B:
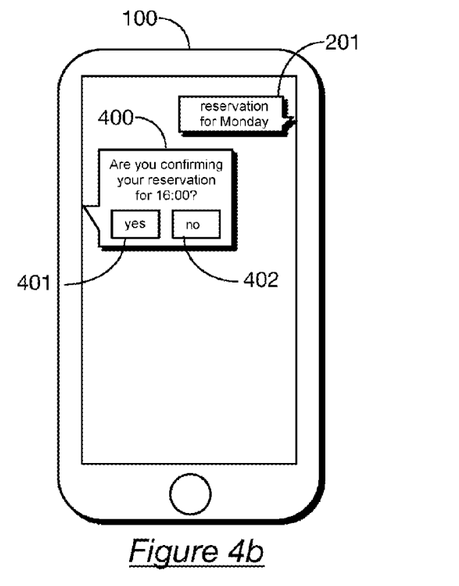

Such a characteristic of the message 204 is for example the indication of change of state "2/3" of the reservation process represented on the message 204 of FIG. 2a. When such a characteristic is detected in the message, the modification of the display area can consist of a deletion of the conversation bubbles corresponding to the selected messages. Thus, the messages relating to the previous steps of the reservation process are no longer visible and the readability of the display is improved. FIG. 4b illustrates such a modification of the display area of the selected messages 202 and 203. In this example, the modification of the display area consists in deleting the corresponding conversation bubbles. Thus, the bubbles of conversations corresponding to the messages 202 and 203 are deleted or masked, before the message 204 is displayed.

However, other characteristics of the message can be used to determine the type of modification of the display area. Accordingly, the terminal may for example comprise in its memory a table comprising associations between characteristics of messages and a type of display modification. According to a particular embodiment, the characteristic according to which the display is modified consists of a set of display instructions interpretable by the terminal. This entails for example a fragment of code in the html, xml, javascript format or in any other language able to be interpreted and executed by a processor of the terminal.

Figure 4C:
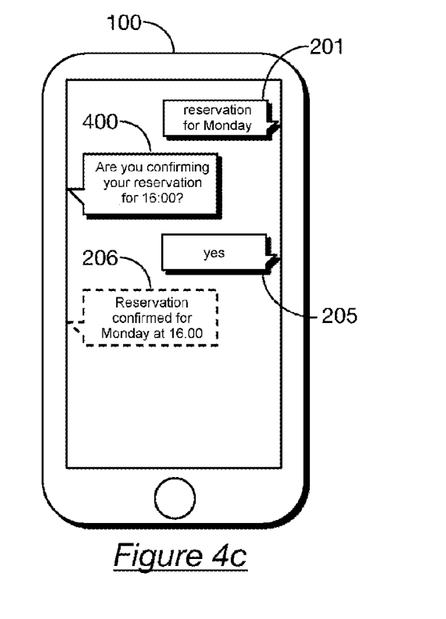

According to a particular realization, the characteristic of the message is an indication relating to the type of response expected subsequent to the receipt of the message. For example, the message can comprise a datum indicating that the expected response is a binary response of type "yes" or "no". For example, the message 204 represented in FIG. 2a comprises such a datum transmitted in a field provided for this purpose whose value is "yn". When such a characteristic is included in a received message, the display modification can consist for example of the displaying in the conversation bubble of user interface elements, such as "yes" and "no" buttons allowing a fast response to the message through a simple action of the user on one of these buttons. Such a modification of the display is represented in FIG. 4b in which are depicted buttons 401 and 402 displayed subsequent to the detection of the datum "yn" included in the message 204. An action of the user on the button 401 then causes the message 205 represented in FIG. 4c to be sent, the message comprising the grouping identifier #id1 and a text field "yes" destined for the conversational agent. The sending of such a message causes the execution of steps 300, 301 and 302 of the organizing method and causes a modification of the display of the conversation bubble 400 corresponding to the message 204 whose grouping identifier #id1 is identical to that of the message 205. In this example, such a display modification consists in masking the response buttons 401 and 402 of the conversation bubble 400, as illustrated in FIG. 4c. Thus, according to the invention, the sending of a particular message can cause a modification of a display area associated with a previously received message.

FIG. 4c represents messages displayed on the terminal 100 just after the receipt of the message 206 sent by the conversational agent. The message 206 is then received by the terminal, stored in a memory, but it is not yet displayed. Reception of such a message triggers the execution of the organizing method and in particular of steps 300, 301 and 302 described previously. During step 301, the messages 202 and 203 are selected on the basis of their grouping identifier during step 301. The message 206 further comprises a characteristic able to cause a modification of the display of the conversation bubble associated with the message 205 and of the conversation bubble 400 resulting from a display modification subsequent to the receipt of the message 204 as described with reference to FIG. 4b.

The message 206 further comprises an indication according to which the message is the last message of a series of messages associated with the same grouping identifier. In this instance, the message 206 comprises an information item on the advancement of the reservation process, said information item indicating that the message corresponds to the third step of an interaction comprising 3 steps. Any other indication allowing the terminal 100 to deduce that the message is the last message of the interaction can also be used. This may entail for example a boolean value which, when the latter is true, indicates a last message.

Figure 4D:
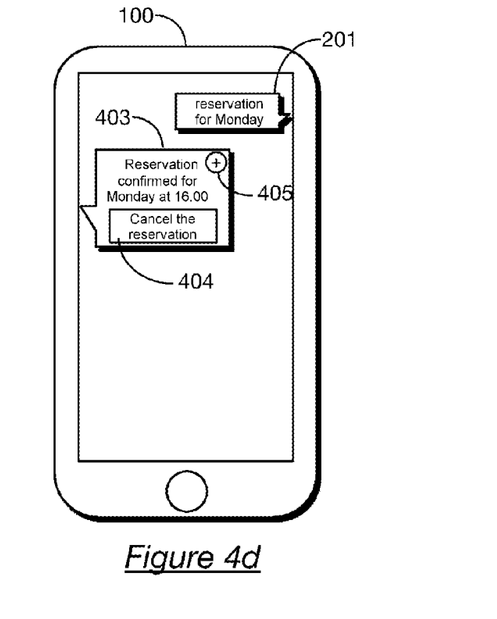

FIG. 4d illustrates a modification of the display of the selected messages following the receipt of the message 206, the modification being carried out according to the characteristic according to which the message is the last of the interaction. This modification comprises the masking of the conversation bubbles associated with the messages and the displaying in a new conversation bubble 403 of the message 206 received and of an interaction element, such as a button 404. An action on the button 404 causes for example the sending of a predefined message making it possible to cancel the reservation. Any other display modification is conceivable, such as for example a change of color of the conversation bubble, or else the display of a particular pictogram.

Thus, by virtue of the method according to the invention, the number of messages displayed on the screen of the terminal on completion of the reservation has been able to be reduced with respect to the conventional display represented in FIG. 2b.

According to a particular embodiment, the method comprises a step of canceling the modifications of the at least one display area when an interaction on a modified display area is detected. Accordingly, the method detects, during a step 303, an interaction of the user on an interaction element such as the button 405. As a variant, the interaction can be detected during an action of the user on the conversation bubble itself. In this way, it is unnecessary to display an interaction element such as the element 405 and the use of the screen of the terminal is further optimized. According to yet another variant, the interaction element allowing the detection of an action of the user is not associated with a particular conversation bubble and causes restoral of the display of all the messages exchanged with the conversational agent, including the display of messages relating to reservations made or other interactions performed previously.

When an interaction is detected in step 303, the terminal cancels the modifications carried out previously on the conversation bubbles. For example, the messages are displayed according to a conventional conversational view such as illustrated in FIG. 2b. The cancellation of the modifications may be temporary or definitive. When cancellation is temporary, the modifications are re-applied after the expiry of a predefined lag or upon the detection of a particular event, such as an action of the user on a predetermined graphical interface element.

According to a particular embodiment, the characteristic is a datum relating to the importance of the message. For example, this may entail an information item positioned in a field provided for this purpose whose value may for example be "low" or "high". A modification associated with such a characteristic may be for example a change of the color of the conversation bubble or of the message.

According to a particular embodiment, the step of modifying at least one display area comprises the masking of the messages selected in step 301, and the displaying of a message representative of the messages masked in a new conversation bubble. A representative message can consist of a concatenation of the messages selected into a single message or else a summary of the messages exchanged. For example, the messages 201 and 203 represented in FIG. 2b can be concatenated and displayed in a single conversation bubble so as to optimize the space occupied on the screen and improve the readability of the exchange. Accordingly, the messages 201 and 203 can share one and the same grouping identifier distinct from the grouping identifier #id1. In this way, the display modifications related to the exchanges of messages comprising the identifier #id1 have no influence on the messages 201 and 203. On the other hand, sending the message 203 may cause a modification of the display of the conversation bubble of the message 201 which consists of the concatenation of the message 203 and 201 and the displaying of this concatenated message in a single conversation bubble.

According to a particular embodiment, the step of modifying at least one display area comprises the replacing in a display area of at least one message selected with the message exchanged.

According to a particular embodiment, the method is such that it further comprises a step of rendering a notification on the terminal, the notification being rendered according to the at least one characteristic of the message exchanged. In a conventional manner; a terminal can send a notification when a message is received. For example, on receipt of a message, the terminal can emit a sound, a vibration, or display a message on the home-page screen of the terminal when the latter is locked. Such a notification is aimed at drawing the attention of the user to the fact that a new message is available. According to the invention, the notification is rendered as a function of a characteristic of the received message or of a sent message. For example, when the characteristic comprises an indication according to which the message is a message terminating an interaction, the notification rendered may be different from a notification rendered for a message which is not the last message of an interaction. Accordingly, the terminal can search for a particular characteristic in the message and consult a correspondence table to determine the way to render the notification, such as for example select a sound or a particular sequence of vibrations. Thus, the user's attention can be drawn to the receipt of a particular message showing for example that an order is confirmed or that a response is required from the user so that the transaction process can be continued.

Figure 5:
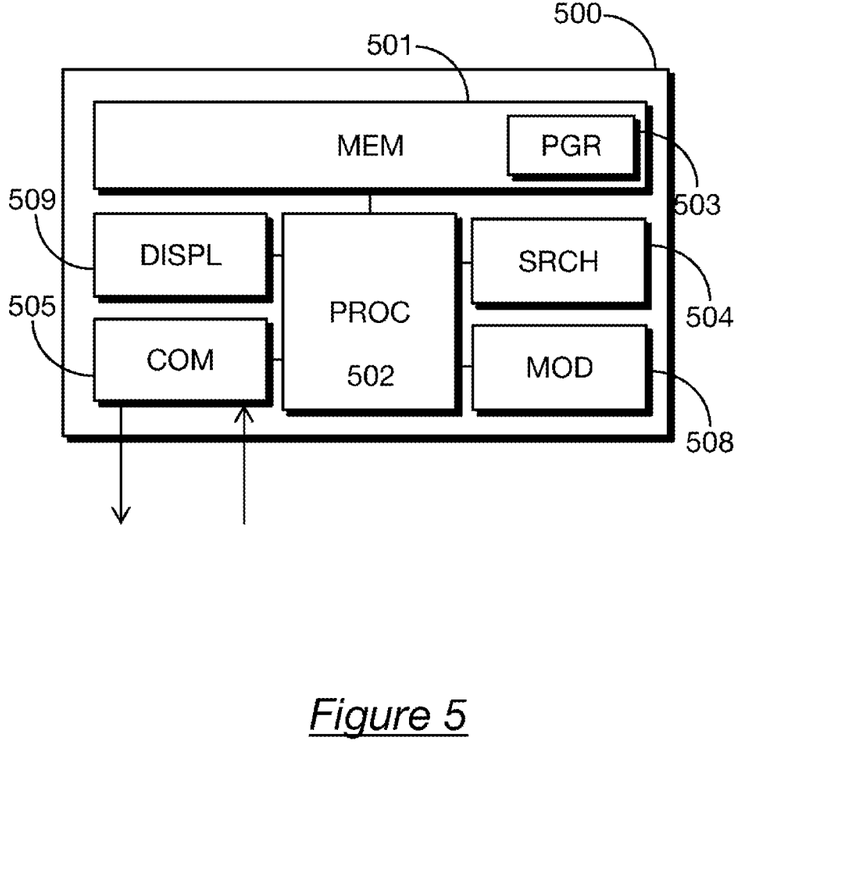
FIG. 5 represents in a simplified manner the architecture of a device adapted to implement the invention according to a particular embodiment.

FIG. 5 illustrates, according to a particular embodiment of the invention, a device 500 implementing the organizing method.

The device comprises a storage space 501, for example a memory MEM, a processing unit 502 equipped for example with a processor PROC. The processing unit can be driven by a program 503, for example a computer program PGR, implementing the organizing method such as described in the invention with reference to FIG. 3, and in particular the steps of exchanging a new message, of selecting, from among the messages of the conversation, at least one message whose grouping identifier corresponds to the grouping identifier of the message exchanged, and when at least one message is selected, of modifying at least one display area on the screen of the terminal corresponding to at least one of the messages selected, according to at least one characteristic of the message exchanged.

On initialization, the instructions of the computer program 503 are for example loaded into a RAM (Random Access Memory) memory before being executed by the processor of the processing unit 502. The processor of the processing unit 502 implements the steps of the organizing method according to the instructions of the computer program 503.

Accordingly, the memory 501 is furthermore adapted to store at least one message exchanged with a conversational agent, the message comprising a grouping identifier and a particular characteristic.

The device 500 further comprises communication means 505, such as for example a network interface COM, allowing the device to connect to a telecommunication network and to exchange data with other devices by way of the telecommunications network, and in particular to exchange messages with a conversational agent.

The device 500 also comprises a selection module 504 implemented when receiving or sending a new message comprising a grouping identifier. Such a module is adapted to select, from among the messages stored in the memory, at least one message whose grouping identifier corresponds to the grouping identifier of the new message. Such a module is for example implemented by computer program instructions configured to perform a search in a memory or a database and executed by the processor PROC of the device. For example, the module 504 can execute an SQL (Simple Query Language) query configured to select messages possessing a particular grouping identifier in a database.

The device further comprises a display module 508 adapted to modify at least one display area on a screen 509 of the terminal corresponding to at least one of the messages selected, according to at least one characteristic of the message exchanged. Such a module is for example implemented by computer program instructions adapted to determine a display area associated with one or more particular messages, and to modify the content displayed in this area, the computer program instructions being executed by the processor PROC. The computer program instructions are for example configured to mask or replace the content displayed in a particular display area.

Although the present disclosure has been described with reference to one or more examples, workers skilled in the art will recognize that changes may be made in form and detail without departing from the scope of the disclosure and/or the appended claims.

The invention claimed is:

1. A method comprising:
    organizing a plurality of messages of an instant messaging conversation between a terminal and a conversational agent, wherein the conversational agent is programmed to respond automatically to messages of the plurality that are sent by the terminal according to a determined logic and at least one message of the plurality of messages comprises a grouping identifier, wherein the organizing comprises acts performed by a device in response to exchanging a new message of the conversation, which has the grouping identifier, and wherein the acts comprise:

selecting, from among the plurality of messages of the conversation, at least one message whose grouping identifier has a value that corresponds to a value of the grouping identifier of the new message exchanged, modifying at least one display area on a screen of the terminal corresponding to the selected at least one message by reducing a number of displayed messages, according to at least one characteristic of the new message exchanged.

2. The method as claimed in claim 1, in which the value of the grouping identifier is associated with an ongoing interaction with the conversational agent that sent the new message, the interaction comprising a plurality of successive states.

3. The method as claimed in claim 2, in which the at least one characteristic of the new message exchanged comprises an indication relating to a state of progress of the interaction with the conversational agent.

4. The method as claimed in claim 1, further comprising rendering a notification on the terminal, the notification being rendered according to the at least one characteristic of the new message exchanged.

5. The method as claimed in claim 1, in which the at least one characteristic of the new message exchanged comprises an indication the new message being a last message of a series of the plurality of messages that are associated with the same value of the grouping identifier.

6. The method as claimed in claim 1, in which the modifying at least one display area comprises replacing in a display area at least one of the selected at least one message with the new message exchanged.

7. The method as claimed in claim 1, in which the modifying at least one display area comprises masking the selected at least one message, and displaying a message representative of the masked, selected at least one message.

8. The method as claimed in claim 1, comprising canceling modification of the at least one display area when an interaction on a modified display area is detected.

9. A device comprising:
a processor; and
a non-transitory computer-readable medium comprising instructions stored thereon, which when executed by the processor configure the device to organize a plurality of messages of an instant messaging conversation between a terminal and a conversational agent, wherein the conversational agent is programmed to respond automatically to messages of the plurality of messages sent that are sent by the terminal according to a determined logic, and wherein the device organizes the plurality of messages by:

exchanging the plurality of messages, through a communication network, wherein at least one of the plurality of messages comprises a grouping identifier, storing the at least one message that comprises the grouping identifier in a memory, in response to receiving or sending a new message comprising the grouping identifier, selecting, from among the at least one message stored in the memory, at least one message whose grouping identifier has a value corresponds to a value of the the grouping identifier of the new message, modifying at least one display area on a screen of the terminal corresponding to the selected at least one message by reducing a number of displayed messages, according to at least one characteristic of the new message exchanged.

10. The device according to claim 9 wherein the device is implemented in the terminal.

11. A non-transitory computer-readable information medium on which is recorded a computer program comprising instructions which, when the instructions are executed by a processor of a device when a new message is exchanged, configure the device to:

organize a plurality of messages of an instant messaging conversation between a terminal and a conversational agent, wherein the conversational agent is programmed to respond automatically to messages of the plurality that are sent by the terminal according to a determined logic, at least one message of the plurality of messages comprises a grouping identifier, and the new message comprises the grouping identifier, the device organizing the plurality of messages by:

selecting, from among the plurality of messages of the conversation, at least one message whose grouping identifier has a value that corresponds to a value of the grouping identifier of the new message exchanged, modifying at least one display area on a screen of the terminal corresponding to the selected at least one message by reducing a number of displayed messages, according to at least one characteristic of the new message exchanged.

* * * * *